United States Patent [19]

Spiteri

[11] 4,155,013
[45] May 15, 1979

[54] LIQUID LEVEL INDICATOR

[76] Inventor: Joseph Spiteri, Box 71, Harborcreek, Pa. 16421

[21] Appl. No.: 840,136

[22] Filed: Oct. 7, 1977

[51] Int. Cl.² ............................ G01N 21/26; G01N 21/48
[52] U.S. Cl. ................................................ 250/577; 73/293
[58] Field of Search .............................................. 250/577

[56] References Cited

U.S. PATENT DOCUMENTS

| 2,350,712 | 6/1944 | Barsties | 250/577 X |
| 3,448,616 | 6/1969 | Wostl et al. | 250/577 X |
| 3,454,759 | 7/1969 | Calhoun | 250/577 X |
| 3,639,770 | 2/1972 | Zizelmann | 250/577 X |
| 3,995,169 | 11/1976 | Oddon | 250/577 |

Primary Examiner—Robert Segal
Attorney, Agent, or Firm—Ralph Hammar

[57] ABSTRACT

A liquid level monitor using the difference between the refraction of light by a prism in contact with air and by the same prism in contact with liquid being monitored to give warning of low liquid level. In preferred form for monitoring engine oil level, light is transmitted to a prism by an incoming fiber optic lead and returned from the prism by a return fiber optic lead. When the oil level is normal, the prism is in contact with the oil and the incoming light is transmitted into the oil and dissipated. When the oil level drops, the incoming light is reflected by the prism to the return lead and the reflected light is used to provide the indication of low oil level.

3 Claims, 2 Drawing Figures

LIQUID LEVEL INDICATOR

This invention is intended to monitor liquid level and to give a warning whenever the liquid is dangerously low. One use is for monitoring the level of crank case engine oil. Other uses are to monitor the level of cooling water, fuel, etc.

Figure 1:
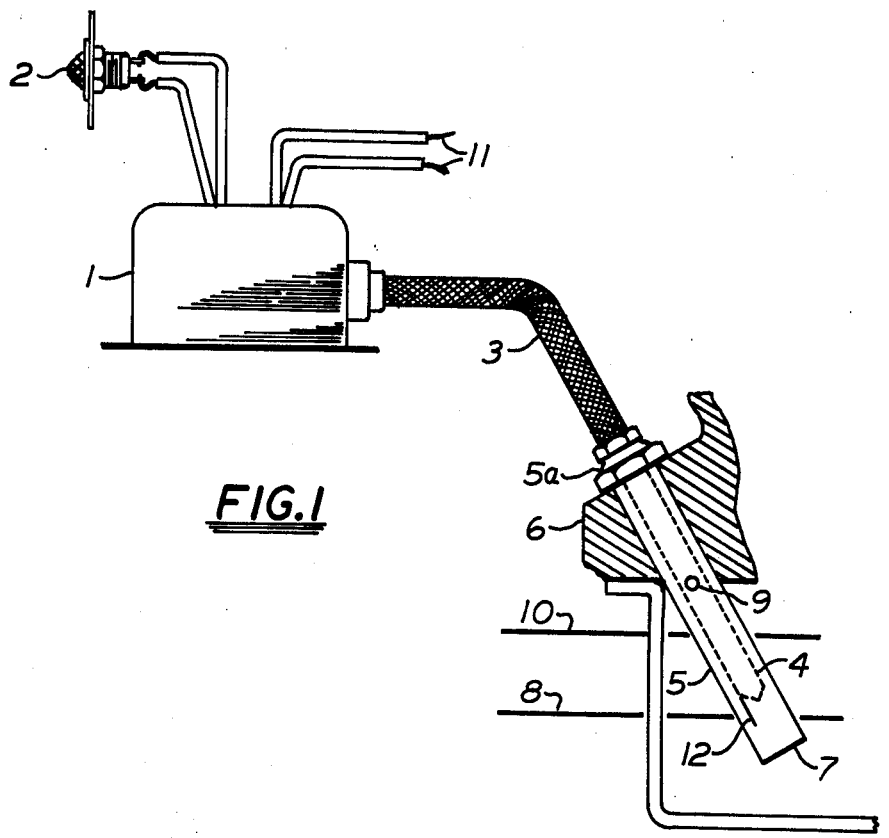
Figure 2:
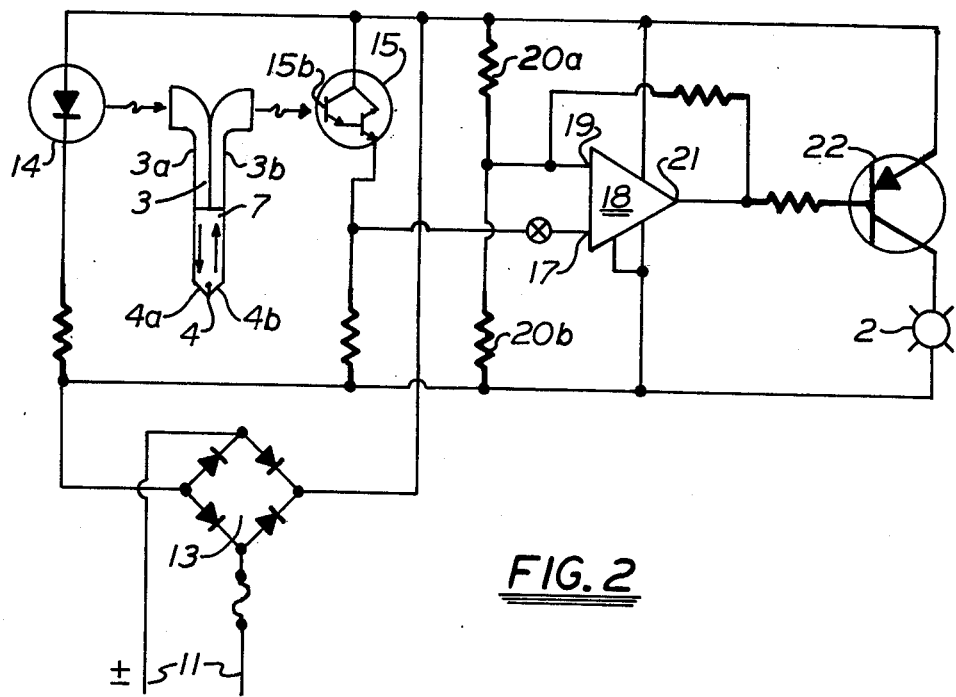

In the drawing FIG. 1 is a diagram of a liquid level monitor installed in an engine block to monitor the crank case oil, and FIG. 2 is a circuit diagram.

As shown in FIG. 1, the liquid level monitor comprises a control box 1, an indicating lamp 2, a dual fiber optic cable 3 leading from the control box 1 to a prism 4 at the lower end of a tubular probe 5 installed in an engine block 6. The lower end 7 of the probe is below the danger level 8 of the crank case oil and the tube has a vent opening 9 above the normal oil level 10 which insures that the oil level within the tube is substantially the average oil level in the crank case and is unaffected by turbulence or splashing. The prism 4 has a fine wire tongue 10 which serves as a wick for drawing oil off the lower end of the prism so that when the oil level drops to the danger level 8, the faces 4a, 4b of the prism have only a thin film of oil and behave as though in direct contact with the air.

When used for monitoring the oil level in a truck engine, the control box 1 and indicator lamp would be mounted in the cab and the power supply leads 11 would be connected to the truck battery. The fiber optic cable 3 would extend from the control box to the upper end 5a of the probe 5 and the prism 4 would be positioned at the danger level for crank case oil. Without any oil in the crank case, the incoming light would travel down incoming fiber optic lead 3a and would strike face 4a of the prism at an angle greater than the critical angle. Light would be reflected internally across to face 4b of the prism and again reflected out through return fiber optic lead 3b.

Light for operating the liquid level monitor is derived from an infrared light emitting diode (GE No. 55L55B) energized from the power supply 11 through a bridge rectifier 13. The bridge makes the operation of the light emitting diode independent of the polarity of the power supply, positive ground or negative ground. Infrared light is emitted continuously to upper end of fiber optic conductor 3a the lower end of which terminates in prism 4 and directs light onto prism face 4a. If the prism is above the oil level, the light is totally reflected to fiber optic lead 3b and discharged against the base 15b of photo transistor 15 (Clairex CLR-21.70).

When no light is received by the fiber optic cable 3b the photo transistor 15 is off and the terminal 17 of voltage comparator 18 (Motorola IC MLM 311G) is zero. The terminal 19 of voltage comparator 18 is maintained constant positive by voltage divider 20a, 20b. Under this condition the voltage comparator 18 has a zero output at terminal 21 and transistor 22 in series with warning light 2 is biased off. This is the condition of the circuit when the oil level is normal and the prism 4 is immersed in oil. When immersed in oil the light input through fiber optic cable 3a is not reflected by the prism surface 4a but instead is transmitted into the oil because the oil is a denser medium than air. When the oil level drops so that the prism 4 is above the oil level, then the incoming light from fiber optic cable 3a is reflected by prism surfaces 4a, 4b and out through fiber optic cable 3b to the base electrode 15b of photo transistor 15. Under this condition, the photo transistor is turned on and terminal 17 of the voltage comparator 18 rises toward the positive power supply voltage. Under these conditions the output of the voltage comparator at terminal 21 becomes strongly positive and the base the transistor 22 is biased on to saturation causing the lighting of the warning light 2. The warning light 2 stays on until enough oil is added to bring the crank case oil level above the danger level.

The voltage comparator 18 has two steady state conditions, a condition in which the comparator has a zero output at terminal 21 biasing the transistor 22 off and a condition in which the comparator has a positive output at terminal 21 biasing the transistor 22 on.

From one aspect the photo transistor 15 and the voltage comparator 18 act as switches which are responsive to the presence or absence of light in the return fiber optic cable 3b.

The voltage comparator can be viewed as a dual input logic circuit comparator which has a zero output when terminal 17 is negative with respect to terminal 19 and has a positive output when terminal 17 is positive with respect to terminal 19.

I claim:

1. A warning device for low level of crankcase oil for an internal combustion engine comprising a control means mounted outside said engine, said control means including a light source, a warning device, switching means, and light responsive means for activating said switching means for turning the warning device on and off, a tubular probe installed in said engine with the lower end of the probe extending below the dangerously low level of the crankcase oil and the upper end of the probe extending to the outside of the engine and said probe having a vent opening above the normal level of the crankcase oil which insures that the oil level within the tube is substantially the average oil level in the crankcase and is unaffected by turbulence or splashing, prism means mounted in the tube having surfaces positioned to be immersed in the oil in said tube at normal oil level and to be above the oil in said tube at a predetermined low crankcase oil level, a fiber optic cable for conducting light from said source through the probe to said prism means, said prism means when said surfaces are immersed in the oil transmitting said light to the oil and said prism means when said surfaces are above the oil internally reflecting said light and delivering the same from said prism means to another fiber optic cable leading through the probe to said light responsive means for turning said warning device on for indicating a crankcase oil level at or below said predetermined oil level, said prism means having a wick for drawing oil off the lower end of the prism means, so that when the crankcase oil level drops to said predetermined low level, only a thin film of oil remains on the lower end of the prism means which behaves as though in direct contact with air.

2. The device of claim 1 in which the means responsive to the internally reflected light is a photo transistor switch.

3. The device of claim 1 in which the indicating means is driven by a voltage comparator, one input being fixed and the other input having a value negative with respect to said one input in the absence of internally reflected light and a value positive with respect to said one input in the presence of internally reflected light.

* * * * *